US010807384B2

(12) United States Patent  
Manninen et al.

(10) Patent No.: US 10,807,384 B2  
(45) Date of Patent: Oct. 20, 2020

(54) METHOD FOR DYNAMICALLY ALLOCATING AND TRANSMITTING UNIQUE CODES TO A PRINTING MACHINE

(71) Applicant: Magic Add Oy, Turku (FI)

(72) Inventors: Samuli Manninen, Helsinki (FI); Ari Salonen, Turku (FI); Kalle Euro, Turku (FI); Mika Skarp, Espoo (FI)

(73) Assignee: Magic Add Oy, Turku (FI)

( * ) Notice: Subject to any disclaimer, the term of this patent is extended or adjusted under 35 U.S.C. 154(b) by 0 days.

(21) Appl. No.: 16/488,363

(22) PCT Filed: Mar. 5, 2018

(86) PCT No.: PCT/FI2018/050159  
§ 371 (c)(1),  
(2) Date: Aug. 23, 2019

(87) PCT Pub. No.: WO2018/162797  
PCT Pub. Date: Sep. 13, 2018

(65) Prior Publication Data  
US 2019/0381807 A1 Dec. 19, 2019

Related U.S. Application Data

(60) Provisional application No. 62/467,915, filed on Mar. 7, 2017.

(51) Int. Cl.  
*B41J 3/407* (2006.01)  
*B41J 3/01* (2006.01)  
*G06F 21/60* (2013.01)

(52) U.S. Cl.  
CPC .............. *B41J 3/4075* (2013.01); *B41J 3/01* (2013.01); *B41J 3/4073* (2013.01); *G06F 21/608* (2013.01)

(58) Field of Classification Search  
None  
See application file for complete search history.

(56) References Cited

U.S. PATENT DOCUMENTS

2005/0258234 A1* 11/2005 Silverbrook ....... G06Q 20/3674  
235/379  
2006/0220865 A1* 10/2006 Babine ................ G06Q 10/087  
340/572.1  
2014/0333947 A1* 11/2014 Robinson .............. G06F 3/1248  
358/1.13

FOREIGN PATENT DOCUMENTS

EP 0578264 A2 1/1994

OTHER PUBLICATIONS

International Search Report and Written Opinion of the International Searching Authority, applicaiton No. PCT/FI2018/050159, dated Jun. 5, 2018, 18 pages.

(Continued)

*Primary Examiner* — Frantz Bataille  
(74) *Attorney, Agent, or Firm* — Ziegler IP Law Group, LLC

(57) ABSTRACT

A method of using a central computer that is communicatively connectable to a first control computer and configured to dynamically allocate and transmit unique codes from a server to a first printing machine, having a first rate of printing. The method includes the steps of: receiving a first request for a first patch of unique codes from the first control computer of a first printing machine, wherein the first control computer is communicatively connected to the first printing machine and wherein the first control computer controls the first printing machine for printing the unique codes in package labels; obtaining printing parameters comprising a file size of a unique code and a printing speed of the first printing machine; determining a first time interval between the first request to the server and the unique code (Continued)

being available to be used by the first printing machine; determining a first communication speed between the server and the first printing machine; dynamically calculating a first optimum patch size of the first patch of unique codes to be delivered to the first printing machine based on the first request from the first control computer of the first printing machine, the printing parameters, the first time interval and the first communication speed; and communicating a first patch of unique codes having a patch size equal to the first optimum patch size to the first control computer of the first printing machine.

14 Claims, 9 Drawing Sheets

(56) References Cited

OTHER PUBLICATIONS

International Preliminary Report on Patentability, Application No. PCT/FI2018/050159, dated Mar. 1, 2019, 14 pages.

* cited by examiner

METHOD FOR DYNAMICALLY ALLOCATING AND TRANSMITTING UNIQUE CODES TO A PRINTING MACHINE

TECHNICAL FIELD

The present disclosure relates generally to allocation of unique codes for printing, and more specifically, to a system and a method for dynamically allocating and transmitting unique codes from a server to a printing machine.

BACKGROUND

Products such as cups, bottles etc. typically have labels, which include codes (e.g. QR codes) printed on them. Each specific product (e.g. a mug or a bottle) has a unique QR code printed on it. A buyer or user can scan the unique QR code using a device such as a smart phone, and the device can uniquely identify the product and obtain information on the product from a company server that is associated with the company that makes or sells the product. This also ensures that the product is genuine and not counterfeit. Likewise, the company server can also track which user (e.g. the name of the user, profile information, etc.) has scanned the QR code associated with that specific product, the location of the device etc. The QR codes have to be generated carefully since they have to uniquely identify the product. The Unique QR codes have to be pre-allocated before starting to print on labels using different label printing machines at different locations for a same product. The codes are typically stored in a storage device such as a hard disk, a USB drive, or a CD-ROM and physically transferred to the locations of the label printing machines. Each such storage device may typically store about 10 to 100 million such QR codes, for example. These codes that are stored in the storage devices are at a risk of being stolen and reused (e.g. by counterfeiters).

These unique QR codes have to be reserved based on the requirement. However, requirements may vary depending on actual usage. Since the QR codes have already been allocated and reserved, stored in storage devices, and/or physically dispatched to the respective locations, there is no scope for modification in availability of QR codes for other machines located elsewhere. For example, if 10 million QR codes are reserved for printing, and if they are not used, or if they are used only partially (e.g., only 10,000 QR codes), then the unused unique QR codes cannot be allocated to any other label printing machine. However, only a limited number of simple QR codes are available for allocation. Long QR codes require a large number of dots and more complexity on the dots that form the QR code, whereas simple QR codes typically include only 8 units of information (numeric, alphanumeric, byte/binary or kanji). For the printing industry, the quality of printing is better for simple codes as compared to the quality of printing for more complex codes. Hence, due to the preference for simpler QR codes, and the limitation in the number of such simple QR codes that are available, it is critical to utilize these limited simple QR codes effectively. The label printing machines typically do not have access to the QR codes in real time.

Therefore, in light of the foregoing discussion, there exists a need to overcome the aforementioned drawbacks in existing methods and systems due to limitations in the availability of small QR codes and under utilization of QR codes that are pre-allocated to specific printing machines, stored, and dispatched in large volumes.

SUMMARY

The present disclosure provides a method of using a central computer that is communicatively connectable to a first control computer and configured to dynamically allocate and transmit unique codes from a server to a first printing machine, having a first rate of printing. The method comprises the steps of:

receiving a first request for a first patch of unique codes from the first control computer of a first printing machine, wherein the first control computer is communicatively connected to the first printing machine, wherein the first control computer controls the first printing machine for printing the unique codes in package labels;

obtaining printing parameters comprising a file size of a unique code and a printing speed of the first printing machine;

determining a first time interval between the first request to the server and the unique code being available to be used by the first printing machine;

determining a first communication speed between the server and the first printing machine;

dynamically calculating a first optimum patch size of the first patch of unique codes to be delivered to the first printing machine based on the first request from the first control computer of the first printing machine, the printing parameters, the first time interval and the first communication speed, wherein the first optimum patch size is a patch size of the first patch of unique codes to be printed in the package labels by the first printing machine; and communicating a first patch of unique codes having a patch size equal to the first optimum patch size to the first control computer of the first printing machine.

The present disclosure also provides a system comprising a central computer that is communicatively connectable to a first control computer and configured to dynamically allocate and transmit unique codes from a server to a first printing machine, having a first rate of printing, wherein the central computer includes a data processing arrangement including a data processor. The data processor is configured to receive a first request for a first patch of unique codes from the first control computer of a first printing machine, wherein the first control computer is communicatively connected to the first printing machine, wherein the first control computer controls the first printing machine for printing the unique codes in package labels;

obtain printing parameters comprising a file size of a unique code and a printing speed of the first printing machine;

determine a first time interval between the first request to the server and the unique code being available to be used by the first printing machine;

determine a first communication speed between the server and the first printing machine;

dynamically calculate a first optimum patch size of the first patch of unique codes to be delivered to the first printing machine based on the first request from the first control computer of the printing machine, the printing parameters, the first time interval and the first communication speed, wherein the first optimum patch size is a patch size of the first patch of unique codes to be printed in the package labels by the first printing machine; and communicate a first patch of unique codes having a patch size equal to the first optimum patch size to the first control computer of the first printing machine.

The present disclosure also provides a computer program product comprising a non-transitory computer-readable storage medium having computer-readable instructions stored thereon, the computer-readable instructions being executable by a computerized device comprising processing hardware to execute the above said method.

Embodiments of the present disclosure substantially eliminate or at least partially address the aforementioned problems in the prior art due to limitations in the availability of small QR codes and under utilization of QR codes that are pre-allocated to specific printing machines, stored, and dispatched in large volumes.

Additional aspects, advantages, features and objects of the present disclosure are made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
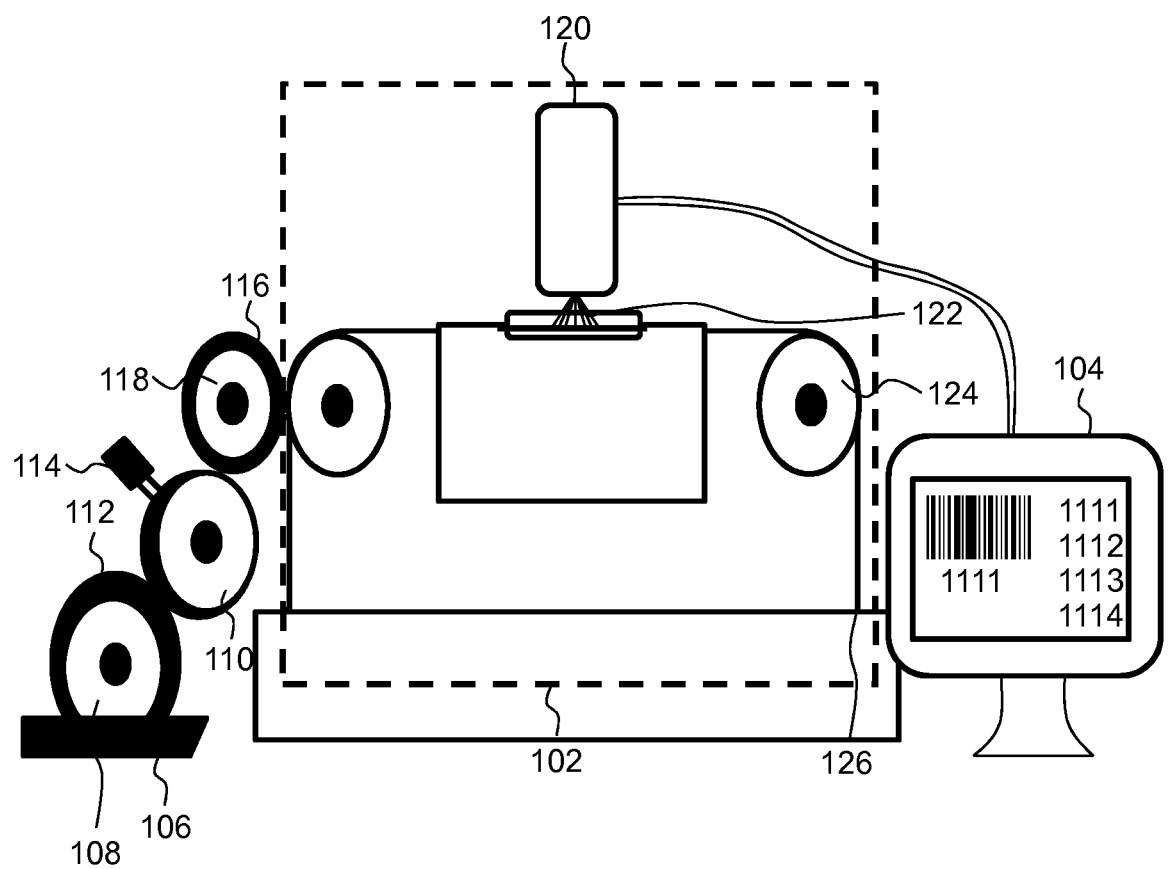
FIG. 1 is a schematic illustration of a system used to print unique codes in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

The present disclosure provides a method of using a central computer that is communicatively connectable to a first control computer, and that is configured to dynamically allocate and transmit unique codes from a server to a first printing machine, having a first rate of printing. The method comprises the steps of:

receiving a first request for a first patch of unique codes from the first control computer of a first printing machine, wherein the first control computer is communicatively connected to the first printing machine, wherein the first control computer controls the first printing machine for printing the unique codes in package labels;

obtaining printing parameters comprising a file size of a unique code and a printing speed of the first printing machine;

determining a first time interval between the first request to the server and the unique code being available to be used by the first printing machine;

determining a first communication speed between the server and the first printing machine;

dynamically calculating a first optimum patch size of the first patch of unique codes to be delivered to the first printing machine based on the first request from the first control computer of the first printing machine, the printing parameters, the first time interval and the first communication speed, wherein the first optimum patch size is a patch size of the first patch of unique codes to be printed in the package labels by the first printing machine; and communicating a first patch of unique codes having a patch size equal to the first optimum patch size to the first control computer of the first printing machine.

The present method thus enables dynamically calculating patch sizes and communicating patches of unique codes to the first control computer from the server with secure transmission as per the requirements received at different time intervals from the first control computer. The method further enables generating the patch size of the unique codes in real time so that under utilization or wastage of unique codes is avoided. The present method thus eliminates the need for permanent allocation of unique codes to the first control computer.

In an embodiment, the server is a centralized server that comprises a database. The database comprises a block chain that may store unique codes to be printed on labels of the products. In an embodiment, the server receives the printing parameters comprising a printing speed of the first printing machine and a second printing machine, the first communication speed (e.g. a bandwidth) that varies at different time intervals, a second communication speed that varies at different time intervals, a number of unique codes to be printed at the first printing machine and the second printing machine etc. In an embodiment, the server dynamically allocates the first unique code based on the printing parameters when the server receives a first request from the first control computer for the first unique code.

In an embodiment, the server is a tablet, a desktop, a smart phone, a personal computer, an electronic notebook, a mobile communication device, an augmented reality device or a virtual reality device. In an embodiment, the first unique code comprises an identity number, a sequence number or a unique quick response code etc. In an embodiment, the central computer is a tablet, a desktop, a smart phone, a personal computer or an electronic notebook etc.

The first control computer communicates with the server and is connected to the first printing machine. The first control computer receives patches of unique codes from the server and transmits them to the first printing machine for printing. In an embodiment, the first control computer and the first printing machine are located in a first location (e.g. in a first country in a first time zone). In an embodiment, there are multiple printing machines and one control computer in the first location. The first control computer of the first printing machine receives the first patch of unique codes from the server to print the unique codes on the labels of the products. In an embodiment, the first control computer is a tablet, a desktop, a smart phone, a personal computer, an electronic notebook, a mobile communication device, an augmented reality device or a virtual reality device.

The first control computer may determine the first time interval from making the first request for the first unique code to receiving the first unique code between the server and the first control computer. In an embodiment, the server may obtain the first time interval from the first control computer. In an embodiment, the first time interval is determined for different amount of payloads in the first request to determine an optimum patch size of the first patch of unique codes to be communicated from the server to the first control computer. In an embodiment, the first control computer utilizes the first patch of unique codes to be printed locally. In another embodiment, the first control computer receives another patch of unique codes when the first patch is fully or almost fully transmitted or printed at the first printing machine.

In one embodiment, the unique codes (e.g. the first unique code and the second unique code) are allocated one by one in real time, however since the server and printing machines may be located far from each other, and depending on a communication speed between the server and a printing machine, there is a time delay (e.g. by a fraction of a second). For example, soft drink companies make nearly 5 billion bottles every day so it is not feasible to transmit the unique codes one by one. Hence, the requirements may be determined on a periodic (e.g. daily) basis. In an embodiment, the unique codes may be transmitted in patches of 1000-5000 quick response codes each depending on the communication speed as well as the printing speed. If the communication speed is slower, the server sends 2000 or 5000 unique codes so that the printing machine doesn't have idle time. In an embodiment, there is a memory buffer in the control computer associated with the printing machine that goes down and then the control computer associated with the printing machine refills the buffer by making a request for a new patch to the server.

In an embodiment, the control computer associated with the printing machine allocates a dynamic amount of memory space to obtain a set of unique codes to print and then when the level of the available memory dips below a threshold, the control computer associated with the printing machine requests a new patch. If the level goes down very fast, the control computer associated with the printing machine has to make the requests more frequently.

The first unique code may be used to access product information over the Internet from an associated web service. The first unique code enables the web service helps to identify which product is scanned with a code reader (e.g. using a smart phone).

According to an embodiment, the first communication speed is re-measured from time to time to re-calculate a patch size of unique codes to be transmitted whenever a request for a patch of unique codes is received from the first control computer of the first printing machine. According to another embodiment, the first unique code to be printed in a package label includes at least one of a quick response code, a data matrix, a bar code, a digital watermark, a serial number, a random number or an alphanumeric string and wherein the first unique code is different for each package label to be printed. According to yet another embodiment, the first time interval is determined by sending a test set of files between the server and the first control computer of the first printing machine. According to yet another embodiment, the first printing machine is a label printing machine.

The unique codes may be digital marks that enable identification of a product. The digital marks may be visible or hidden. Once a product has a unique code identity, additional information can be associated with that the product in real-time. The unique codes allow you to securely track individual products, and also provide personalized digital experiences for users.

In an example embodiment, a range of the unique codes (e.g. quick response codes) is distributed among a plurality of printing machines and among different products. The quick response codes may be used to uniquely identify the products and track each of the products. The user can determine if the product is authentic by scanning the unique code using a smart phone. Unauthorized products or manipulated products are easily identifiable. The present method reduces costs in the supply chain or print production cycle with an efficient track and trace system.

In an embodiment, there is a plurality of printing machines (e.g. a first printing machine, a second printing machine etc.), each having a different rate of printing. For example, the server may send 1000 new unique codes to a first printing machine in Brazil and 5000 new unique codes to a second printing machine in India. At the end of the day in India, when communication speeds are better to India, the server may send 5000 unique codes to India and 1000 to Brazil. The patch size may be varied from country to country, or between the plurality of printing machines in a single country. The plurality of printing machines may be at different locations, which may be at different time zones, and the communication speeds may vary depending on the time (e.g. day or night or the specific time) at the respective locations.

In one embodiment, the transmission of the unique codes may be in parallel but the patches are pre-determined (e.g. a first optimum patch size of the unique codes that will be transmitted to the first printing machine in Brazil and a second optimum patch size of the unique codes that will be transmitted to the second printing machine in India). However, when the server determines that the unique codes in the second printing machine in India are running out, it makes the next unique code patch allocation for transmission to India. In an embodiment, the size of the patch depends on the communication speed and the printing machine speed. The server may determine that the server needs to send 10,000 unique codes to India, in an embodiment. The patch size has to be computed dynamically based on these factors. Thus, the patch size may not be earmarked or completely predetermined in advance, but calculated dynamically based on a combination of printing parameters.

In an embodiment, there are two printing machines in a particular country, out of which one is fast and the other is slow. In one example, if the fast printing machine has been allocated for another purpose during the day, the transmission of unique codes (e.g. quick response codes) may be only to the slow printing machine which prints 100 codes per minute, so the patch size may be only 100 unique codes for the slow printing machine for every minute. During the night, the fast printing machine may become available. For example, the fast printing machine may print 1000 unique codes per minute and so the server may send 1000 unique codes per minute to the fast printing machine.

In an example embodiment, a number of unique codes to be printed at the first printing machine of the first control computer in Brazil are allocated from the server. The first communication speed between the server and the first control computer in Brazil is 1 megabits per second (1 Mbit/sec). The time required to generate a first unique code (e.g. a joint photographic group comprising a quick response code as substance), to communicate the first unique code to the first control computer, to verify that the first unique code is usable and to set the first unique code in a system comprises a first time interval from a first request to a response from the server (e.g. a first time interval for the first request from the first control computer in Brazil to the server in Finland is 3 seconds), a time required to generate the first unique code, a time required to check and setup printing queue etc. The first time interval may be 30 seconds for the first control computer in Brazil. In an embodiment, a file size of the first unique code is 10 kilobits. In another embodiment, a speed of the first printing machine is 10 labels per second. Hence, the number of unique codes to be allocated for Brazil is 100800 (e.g. 10*60*24*7). A total amount of data may be 1.008 Gigabits (e.g. 100800*10 kilobits). The first time interval to communicate the first unique code may be 130.8 seconds (e.g. 30 seconds+1.008 gigabits/1 megabits per second).

In another example embodiment, a number of unique codes to be printed at the second printing machine of the second control computer in India are allocated from the server. The second communication speed between the server and the second control computer in India is 5 megabits per second (5 Mbit/sec). The time required to generate a second unique code (e.g. a joint photographic group comprising a quick response code as substance), to communicate the second unique code to the second control computer, to verify that the second unique code is usable and to set the second unique code in a system comprises a second time interval from a second request to a response from the server (e.g. a second time interval for the second request from the second control computer in India to the server in Finland is 3 seconds), a time required to generate the second unique code, a time required to check and setup printing queue etc. The second time interval may be 30 seconds for the second control computer in India. In an embodiment, a file size of the second unique code is 10 kilobits. In another embodiment, a speed of the second printing machine is 100 labels per second. Hence, the number of unique codes to be allocated for India is 1008000 (e.g. 100*60*24*7). A total amount of data may be 10.008 Gigabits (e.g. 1008000*10 kilobits). The second time interval to communicate the second unique code may be 1030 seconds (e.g. 30 seconds+10.08 gigabits/1 megabits per second).

In an embodiment, an amount of first unique code or the second unique code to be delivered is calculated as $r\_p$=a rate of speed of the first printing machine or the second printing machine in number of printouts per second,
$s$=a size of the first unique code or the second unique code in bits per code,
$com\cdot speed$=a first communication speed or a second communication speed in bits per second,
$t\_d$=a time takes to deliver one unique code in second,
$t\_s$=a time to setup a communication link and a process in second (e.g. a response time),
$n$=a number of unique codes per communication patch, $$t\_d = s/com\cdot speed,$$

In an embodiment, the time to deliver one unique code (e.g. the first unique code or the second unique code) is lesser than the time to use all unique codes (i.e. $t\_s+n*t\_d<n/r\_p$) and $n>(r\_p*t\_s/(1+r\_p*t\_s)$.

For example, a minimum patch size of the first unique code in Brazil is $$t\_d = 10 \text{ kilobits}/1 \text{ megabits per second} = 0.01 \text{ second}$$

$$n>(10/second*30 \text{ seconds})/(1-10/second*0.01 \text{ second})=300/(1-0.2)=333.$$

Hence, minimum of 333 unique codes per transmission is needed for India.

For example, a minimum patch size of the first unique code in India is $$t\_d = 10 \text{ kilobits}/5 \text{ megabits per second} = 0.002 \text{ second}$$

$$n>(100/second*30 \text{ seconds})/(1-10/second*0.002 \text{ second})=3000/(1-0.2)=3750.$$

Hence, a minimum of 3750 unique codes per transmission is needed for India.

According to yet another embodiment, the method further comprises publishing the first patch of unique codes in a block chain.

In an embodiment, the first patch of unique codes that are allocated to the first control computer from the server are recorded in the block chain. The present method further eliminates the need for retrieving the allocated first patch of unique codes from the block chain. In an embodiment, the block chain is used to enhance the security for consumer or user. The block chain may be a distributed file system that distributes unique codes to different control computers (e.g. the first control computer) to print unique codes in the packaging labels by printing machines.

According to yet another embodiment, the method further comprises receiving a second request for a second patch of unique codes from a second control computer of a second printing machine, wherein the second control computer is communicatively connectable to the central computer and to the second printing machine, wherein the second control computer controls the second printing machine for printing the unique codes in the package labels; and dynamically calculating a second optimum patch size of the second patch of unique codes to be delivered to the second printing machine based on the second request, printing parameters of the second printing machine, a second time interval between the second request to the server and the unique code being available to be used by the second printing machine and a second communication speed between the server and the second printing machine, wherein the second optimum patch size is a patch size of the second patch of unique codes to be printed in the package labels by the second printing machine In an embodiment, the server communicates the second patch of unique codes to the second control computer via the communication network. The second control computer communicates with the server and is connected to the second printing machine. The second control computer receives patches of unique codes from the server and transmits them to the second printing machine for printing. In an embodiment, the second control computer of the second printing machine is placed in a second location (e.g. in a second country in a second time zone). In an embodiment, there are multiple printing machines and one control computer (e.g. the second control computer) located in the second location. In an embodiment, the second control computer is a tablet, a desktop, a smart phone, a personal computer, an electronic notebook, a mobile communication device, an augmented reality device or a virtual reality device. In an embodiment, the server may be centrally located in a third location (e.g. Finland).

In an embodiment, the patch size of the first unique code or the second unique code is varied when the communication speed (e.g. the first communication speed or the second communication speed), the size of the first unique code or the second unique code, the time interval (e.g. the first time interval or the second time interval) between the server and the control computer (e.g. the first control computer or the second control computer) changes (e.g. there might be more load in the control computer than normal load or the server may be more loaded than the normal load).

In an embodiment, in a larger printing facility, the central computer is connected to a plurality of control computers (e.g. the first control computer and the second control computer) that controls a first plurality of printing machines (e.g. the first printing machine and a second printing machine). The central computer may control the plurality of control computers for allocating and transmitting the unique codes to the first plurality of printing machines. The central computer may communicate to the server to dynamically allocate and transmit unique codes from the server to the plurality of printing machines.

According to yet another embodiment, the method further comprises communicating a second patch of unique codes having a patch size equal to the second optimum patch size to the second control computer of the second printing machine.

According to yet another embodiment, the method further comprises eliminating duplicate unique codes by comparing the first patch of unique codes associated for the first request with the second patch of unique codes associated for the second request.

The present disclosure also provides a system comprising a central computer that is communicatively connectable to a first control computer, and that is configured to dynamically allocate and transmit unique codes from a server to a first printing machine, having a first rate of printing, wherein the central computer includes a data processing arrangement including a data processor. The data processor is configured to receive a first request for a first patch of unique codes from the first control computer of a first printing machine, wherein the first control computer is communicatively connected to the first printing machine, wherein the first control computer controls the first printing machine for printing the unique codes in package labels;

obtain printing parameters comprising a file size of a unique code and a printing speed of the first printing machine;

determine a first time interval between the first request to the server and the unique code being available to be used by the first printing machine;

determine a first communication speed between the server and the first printing machine;

dynamically calculate a first optimum patch size of the first patch of unique codes to be delivered to the first printing machine based on the first request from the first control computer of the printing machine, the printing parameters, the first time interval and the first communication speed, wherein the first optimum patch size is a patch size of the first patch of unique codes to be printed in the package labels by the first printing machine; and communicate a first patch of unique codes having a patch size equal to the first optimum patch size to the first control computer of the first printing machine.

According to an embodiment, the first communication speed is configured to be re-measured from time to time to re-calculate a patch size of unique codes to be transmitted whenever a request for a patch of unique codes is received from the first control computer of the first printing machine.

According to another embodiment, the first time interval is configured to be determined by sending a test set of files between the server and the first control computer of the first printing machine. According to yet another embodiment, the first control computer associated with the first printing machine is configured to dynamically allocate an amount of memory space to obtain a set of unique codes to be printed.

According to yet another embodiment, the first control computer of the first printing machine is configured to dynamically request a new patch of unique codes when a number of unique codes to be printed in the first control computer is below a threshold level.

The advantages of the present system are thus identical to those disclosed above in connection with the present method and the embodiments listed above in connection with the present method apply mutatis mutandis to the present system.

The present disclosure also provides a computer program product comprising a non-transitory computer-readable storage medium having computer-readable instructions stored thereon, the computer-readable instructions being executable by a computerized device comprising processing hardware to execute the above said method.

The advantages of the present computer program product are thus identical to those disclosed above in connection with the present method and the embodiments listed above in connection with the present method apply mutatis mutandis to the computer program product.

Embodiments of the present disclosure may eliminate the limitations in printing of same unique codes for different products. The embodiments of the present disclosure may eliminate confliction of the unique codes for different products. The embodiments of the present disclosure may generate the patch size of the unique codes in real time so that the wastage of the unique codes for the products is avoided.

DETAILED DESCRIPTION OF THE DRAWINGS

FIG. 1 is a schematic illustration of a system used to print unique codes in accordance with an embodiment of the present disclosure. The system comprises a printing machine 102 and a control computer 104 in one embodiment. The printing machine comprises an ink tray 106, a fountain cylinder 108, an anilox cylinder 110, ink 112, a doctor blade 114, a flexible plate 116, a plate cylinder 118, an ultra violet inkjet 120, a black ultra violet ink 122, an impression cylinder 124 and a substrate 126. The functions of these parts as have been known in the art.

Figure 2:
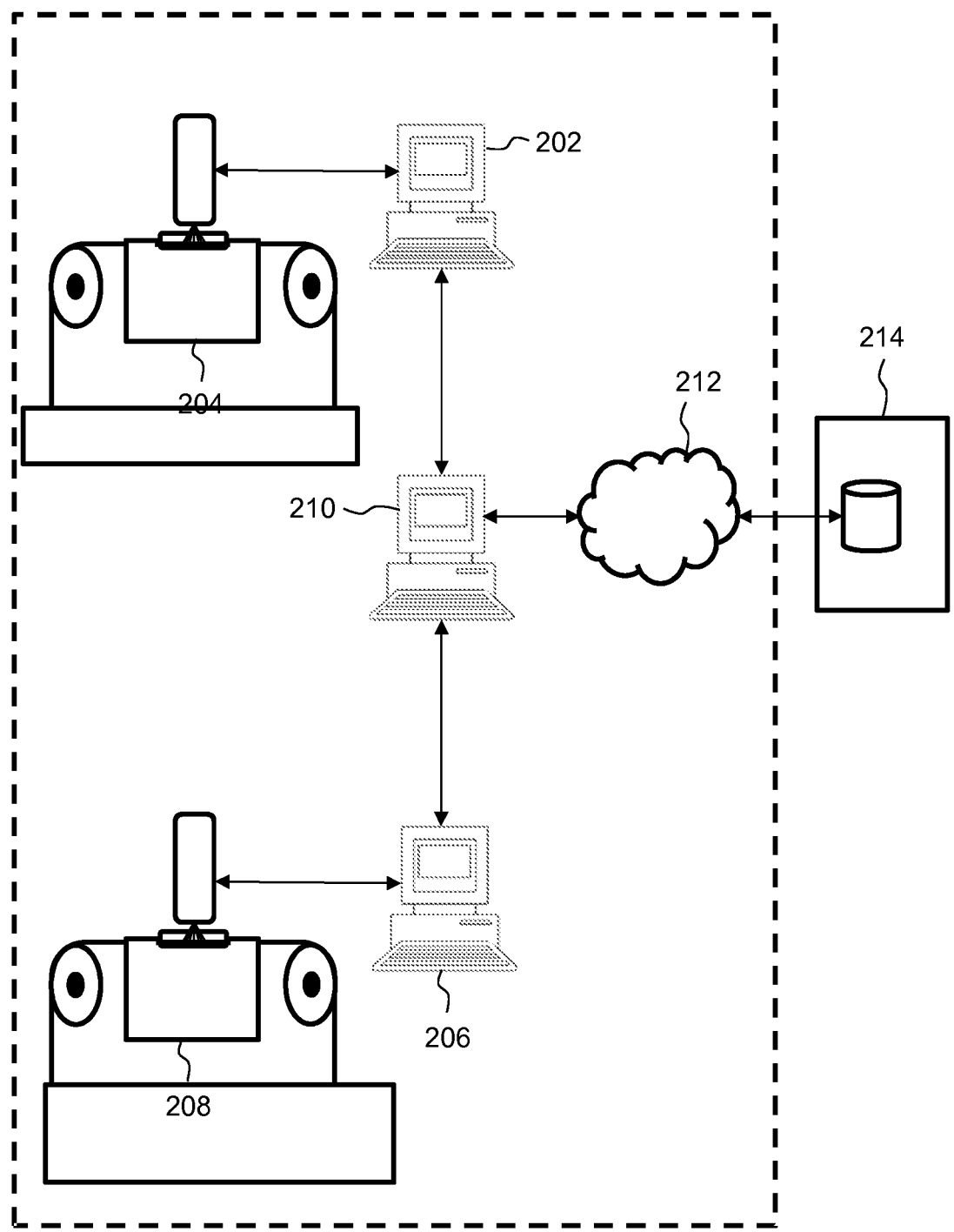
FIG. 2 is a schematic illustration of a system in accordance with an embodiment of the present disclosure.

FIG. 2 is a schematic illustration of a system in accordance with an embodiment of the present disclosure. The system comprises a first control computer 202, a first printing machine 204, a second control computer 206, a second printing machine 208, a central computer 210, a communication network 212 and a server 214. The first printing machine 204 comprises a first printer unit. The second printing machine 208 comprises a second printer unit. The server 212 comprises a database. The central computer 210 controls the first control computer 202 and the second control computer 206. The functions of these parts as have been described above.

Figure 3:
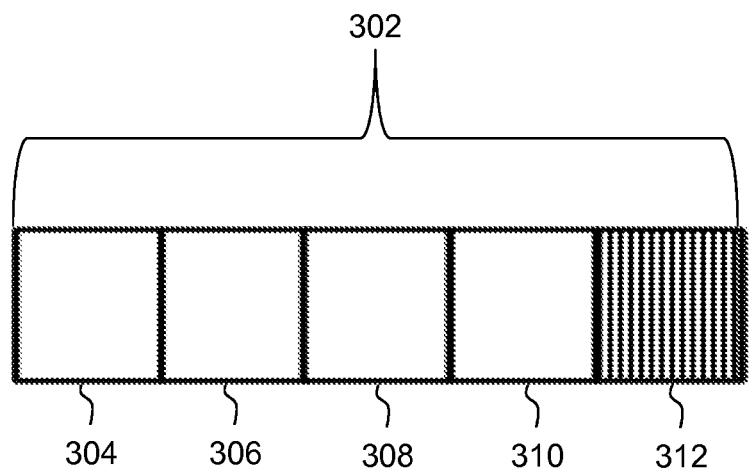
FIG. 3 is an exemplary view of a dynamic memory allocation of unique codes to a control computer associated with a printing machine in accordance with an embodiment of the present disclosure.

FIG. 3 is an exemplary view of a dynamic memory allocation of unique codes to a control computer associated with a printing machine in accordance with an embodiment of the present disclosure. The control computer associated with the printing machine comprises a memory 302. The memory 302 comprises a first memory block 304, a second memory block 306, a third memory block 308, a fourth memory block 310 and a fifth memory block 312. The first memory block 304, the second memory block 306, the third memory block 308 and the fourth memory block 310 are emptied after the corresponding unique codes stored in the blocks are transmitted to or printed by the printing machine. The fifth memory block 312 comprises a patch of unique codes that are yet to be transmitted or printed.

Figure 4:
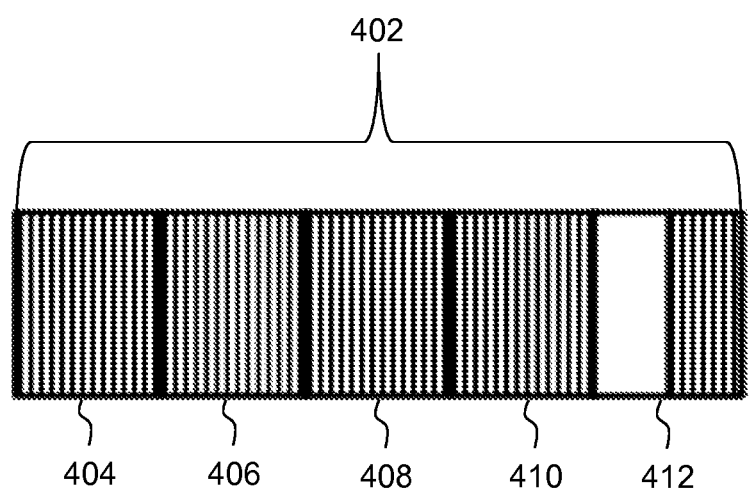
FIG. 4 is an exemplary view of a dynamic memory allocation of unique codes to a control computer associated with a printing machine in accordance with an embodiment of the present disclosure.

FIG. 4 is an exemplary view of a dynamic memory allocation of unique codes to a control computer associated with a printing machine in accordance with an embodiment of the present disclosure. The control computer associated with the printing machine comprises a memory 402. The memory 402 comprises a first memory block 404, a second memory block 406, a third memory block 408, a fourth memory block 410 and a fifth memory block 412. The fifth memory block 412 comprises the unique codes that are partially printed. The control computer associated with the printing machine may send a request for new unique codes to a server when the number of unique codes to be printed in the fifth memory block 412 is below a threshold level, in one embodiment as shown in FIG. 4.

Figure 5:
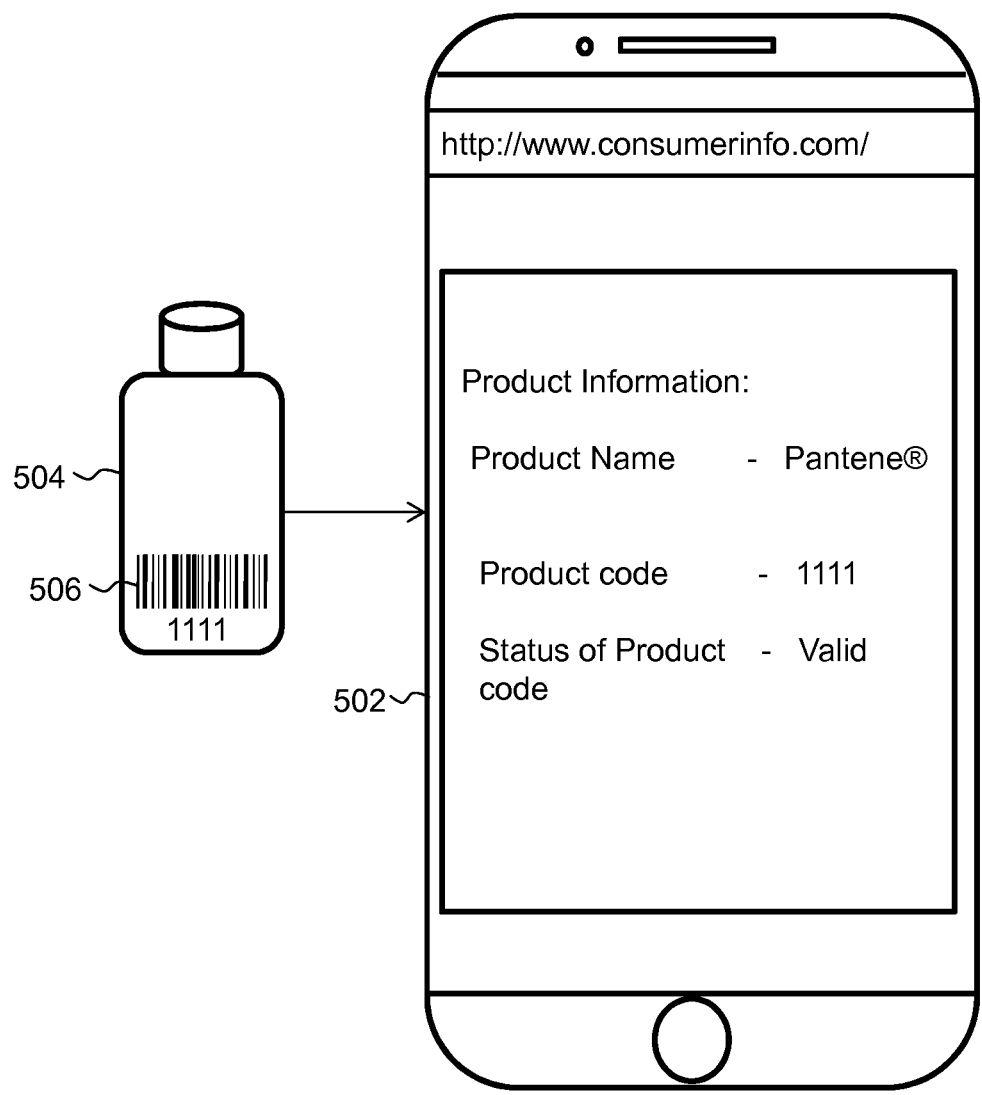
FIG. 5 is an exemplary view that illustrates scanning of a unique code of a product using a smart phone in accordance with an embodiment of the present disclosure.

FIG. 5 is an exemplary view that illustrates scanning of a unique code 506 of a product 504 using a smart phone 502 in accordance with an embodiment of the present disclosure. The product 504 comprises the unique code 506. The unique code 506 (e.g. a quick response code) may be scanned for example by a consumer using the smart phone 502. The smart phone 502 directs a browser to a dedicated consumer site of the product 504 after scanning the unique code. The consumer site may provide an indication whether the unique code 506 of the product 504 is real code or a counterfeit. A range of the unique codes 506 may be arranged in a way such that a web service comprising a uniform resource locator related to the unique codes 506 may keep track of which of the unique codes are used and not used to ensure that the same unique code 506 cannot be used more than one time.

Figure 6A:
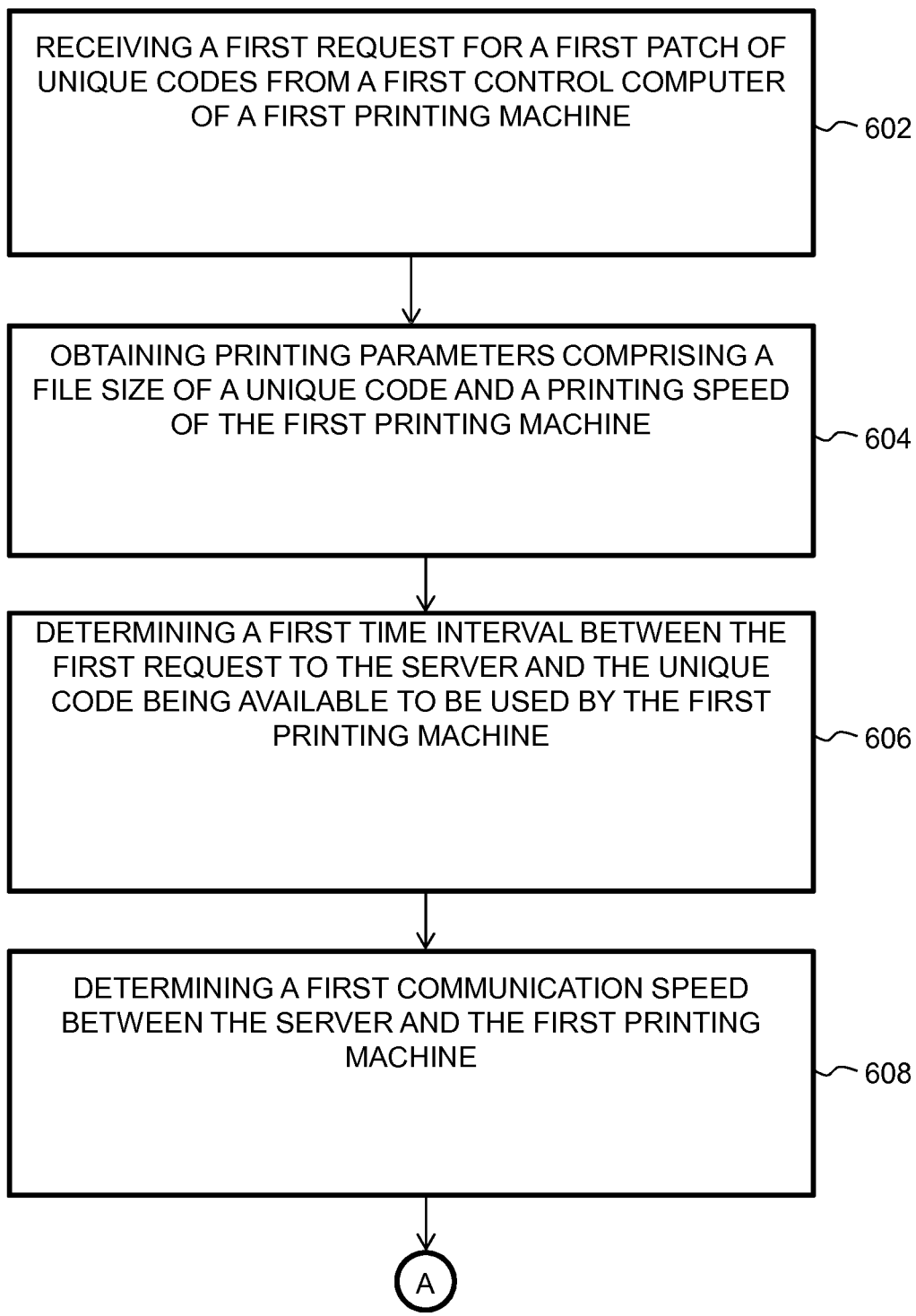
FIGS. 6A-6B are flow diagrams that illustrate a method in accordance with an embodiment of the present disclosure.
Figure 6B:
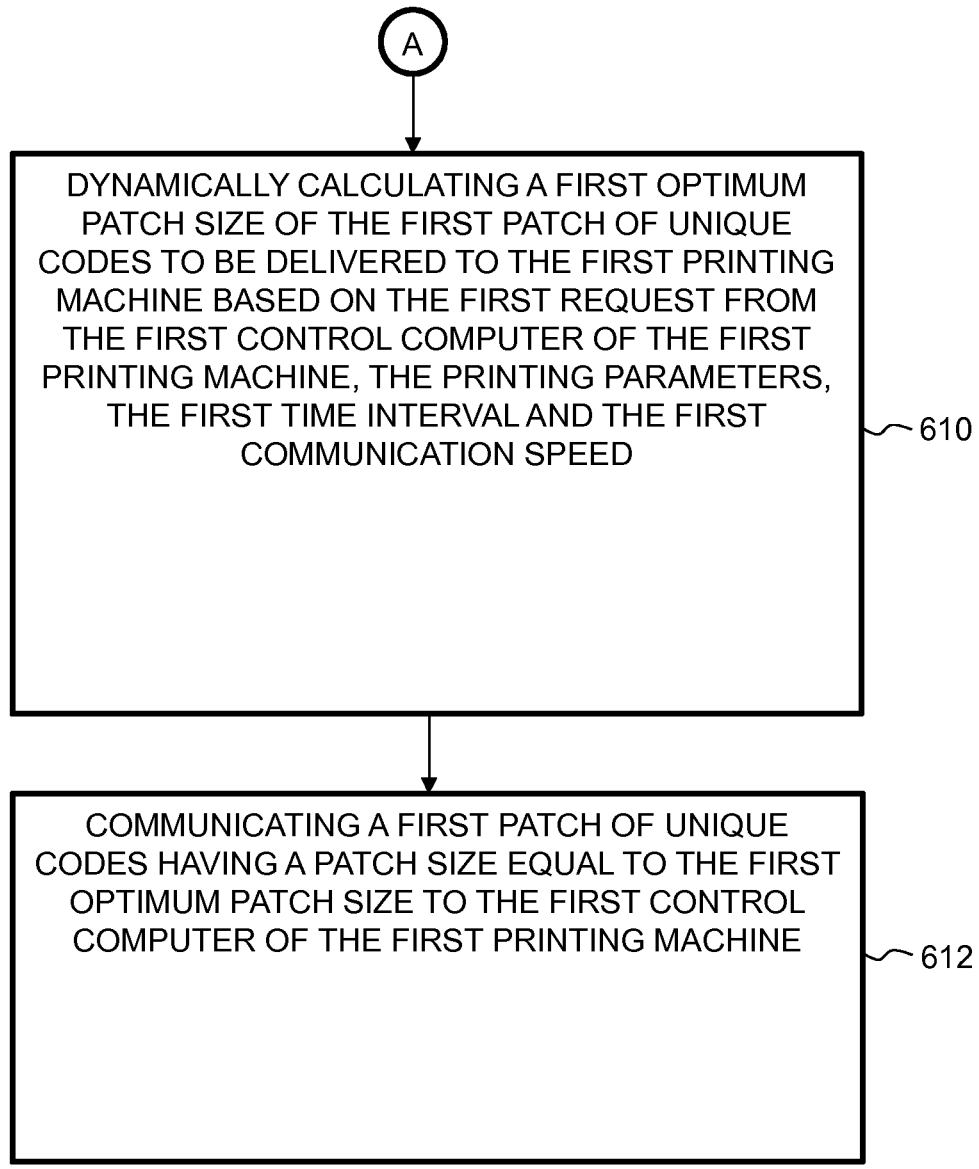

FIGS. 6A-6B are flow diagrams that illustrate a method in accordance with an embodiment of the present disclosure. At step 602, a first request for a first patch of unique codes is received from a first control computer of a first printing machine. The first control computer is communicatively connected to the first printing machine. The first control computer controls the first printing machine for printing the unique codes in package labels. At step 604, printing parameters comprising a file size of a unique code and a printing speed of the first printing machine are obtained. At step 606, a first time interval between the first request to the server and the unique code being available to be used by the first printing machine is determined. At step 608, a first communication speed between the server and the first printing machine is determined. At step 610, a first optimum patch size of the first patch of unique codes to be delivered to the first printing machine is dynamically calculated based on the first request from the first control computer of the first printing machine, the printing parameters, the first time interval and the first communication speed. The first optimum patch size is a patch size of the first patch of unique codes to be printed in the package labels by the first printing machine. At step 612, a first patch of unique codes having a patch size equal to the first optimum patch size is communicated to the first control computer of the first printing machine.

Figure 7A:
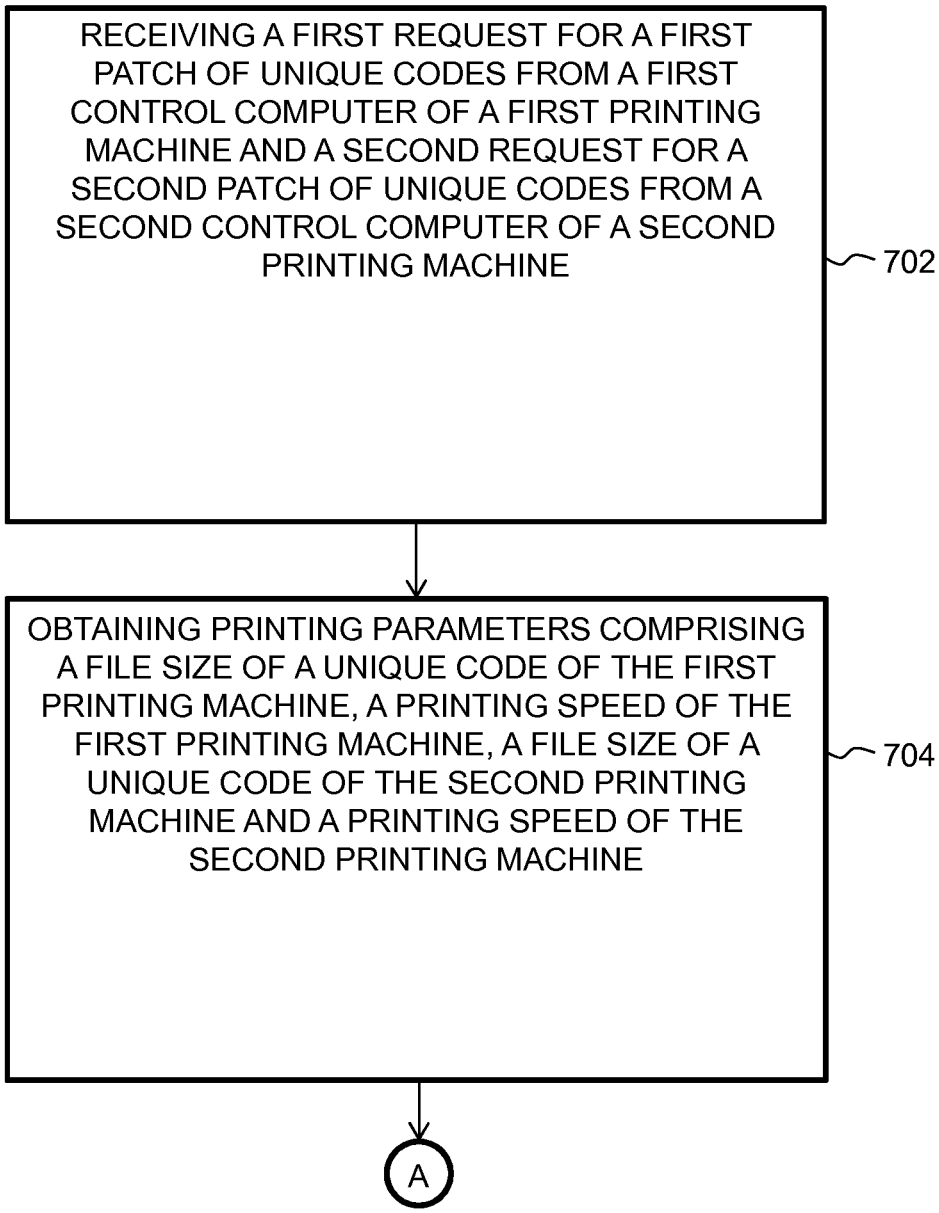
FIGS. 7A-7C are flow diagrams that illustrate a method in accordance with an embodiment of the present disclosure.
Figure 7B:
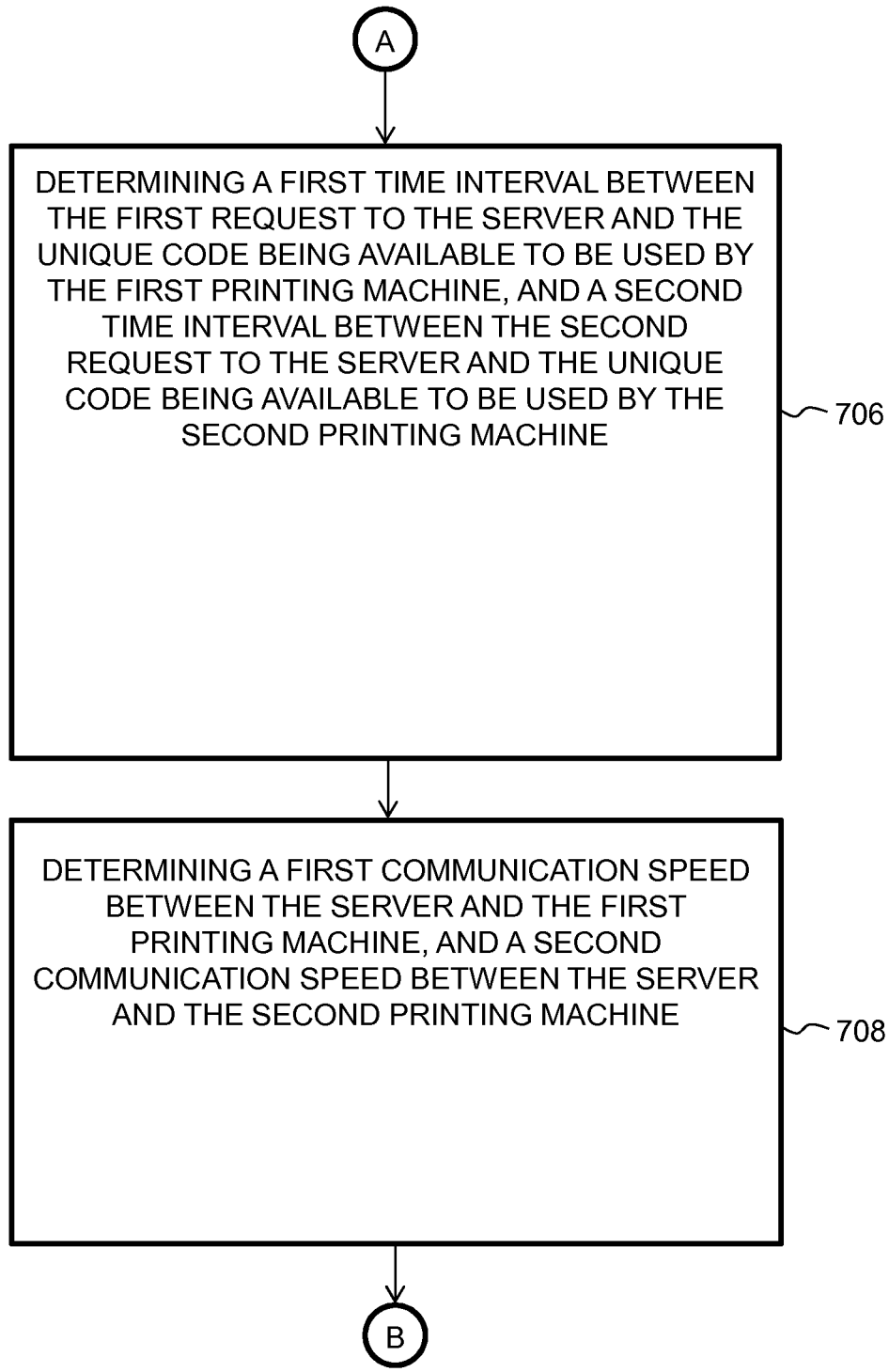
Figure 7C:
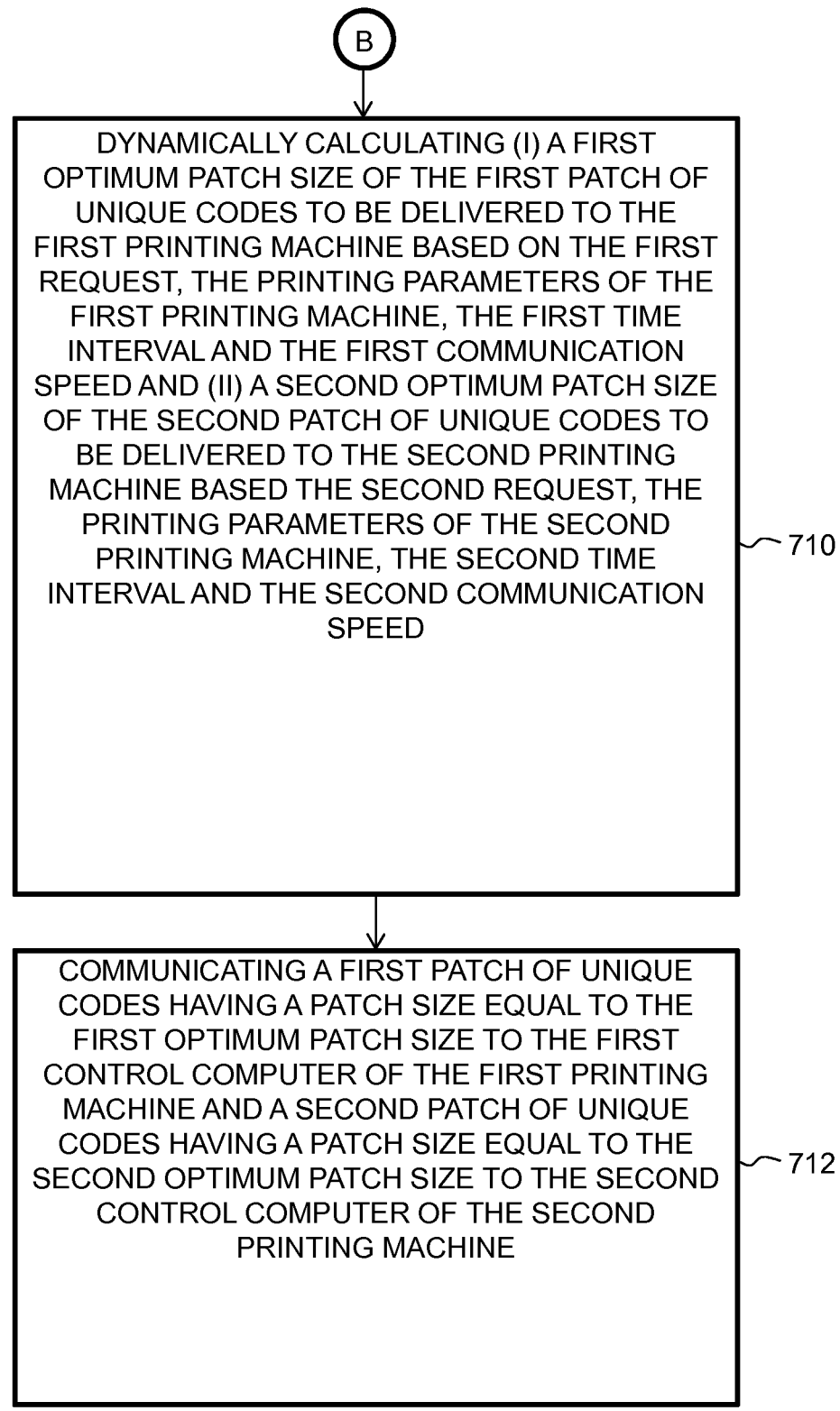

FIGS. 7A-7C are flow diagrams that illustrate a method in accordance with an embodiment of the present disclosure. At step 702, a first request for a first patch of unique codes and a second request for a second patch of unique codes are received from a first control computer of a first printing machine and a second control computer of a second printing machine respectively. At step 704, printing parameters comprising a file size of a unique code of the first printing machine, a printing speed of the first printing machine a file size of a unique code of the second printing machine, and a printing speed of the second printing machine are obtained. At step 706, a first time interval between the first request to the server and the unique code being available to be used by the first printing machine and a second time interval between the second request to the server and the unique code being available to be used by the second printing machine are determined. At step 708, a first communication speed between the server and the first printing machine, and a second communication speed between the server and the second printing machine are determined. At step 710, (i) a first optimum patch size of the first patch of unique codes to be delivered to the first printing machine is dynamically calculated based on the first request from the first control computer of the first printing machine, the printing parameters of the first printing machine, the first time interval and the first communication speed and (ii) a second optimum patch size of the second patch of unique codes to be delivered to the second printing machine is dynamically calculated based on the second request from the second control computer of the second printing machine, the printing parameters of the second printing machine, the second time interval and the second communication speed. At step 712, a first patch of unique codes having a patch size equal to the first optimum patch size and a second patch of unique codes having a patch size equal to the second optimum patch size are communicated to the to the first control computer of the first printing machine and the second control computer of the second printing machine respectively.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method of using a system comprising a central computer, a first control computer and a server, the central computer being communicatively connectable to the first control computer and to the server, the central computer being configured to dynamically allocate and transmit unique codes from the server to the first control computer, wherein the method comprises:

the server receiving a first request for a first patch of unique codes from the first control computer of a first printing machine, wherein the first control computer is communicatively connected to the first printing machine having a first rate of printing, and wherein the first control computer controls the first printing machine for printing the unique codes in package labels;

the server obtaining printing parameters comprising a file size of a unique code and a printing speed of the first printing machine, wherein each unique code which is to be included in a patch has said file size;

determining, using the first control computer, a first time interval between the first request to the server and a first received unique code being available to be used by the first printing machine;

the server determining a first communication speed between the server and the first control computer;

the server dynamically calculating a first optimum patch size of the first patch of unique codes to be delivered to the first control computer based on the first request from the first control computer of the first printing machine, the printing parameters, the first time interval and the first communication speed, wherein the first optimum patch size is a patch size of the first patch of unique codes to be printed in the package labels by the first printing machine; and communicating a first patch of unique codes having a patch size equal to the first optimum patch size to the first control computer of the first printing machine.

2. A method according to claim 1, wherein the first communication speed is re-measured from time to time to re-calculate a patch size of unique codes to be transmitted whenever a request for a patch of unique codes is received from the first control computer of the first printing machine.

3. A method according to claim 1, wherein the first unique code to be printed in a package label includes at least one of a quick response code, a data matrix, a bar code, a digital watermark, a serial number, a random number or an alpha-numeric string and wherein the first unique code is different for each package label to be printed.

4. A method according to claim 1, wherein the first time interval is determined by sending a test set of files between the server and the first control computer of the first printing machine.

5. A method according to claim 1, further comprising publishing the first patch of unique codes in a block chain.

6. A method according to claim 1, further comprising
the server receiving a second request for a second patch of unique codes from a second control computer of a second printing machine, wherein the second control computer is communicatively connectable to the central computer and to the second printing machine, wherein the second control computer controls the second printing machine for printing the unique codes in the package labels; and the server dynamically calculating a second optimum patch size of the second patch of unique codes to be delivered to the second control computer based on the second request, printing parameters of the second printing machine, a second time interval between the second request to the server and the second received unique code being available to be used by the second printing machine and a second communication speed between the server and the second control computer, wherein the second optimum patch size is a patch size of the second patch of unique codes to be printed in the package labels by the second printing machine.

7. A method according to claim 6, further comprising communicating a second patch of unique codes having a patch size equal to the second optimum patch size to the second control computer of the second printing machine.

8. A method according to claim 7, further comprising eliminating duplicate unique codes by comparing the first patch of unique codes associated for the first request with the second patch of unique codes associated for the second request.

9. A system comprising a central computer, a first control computer and a server, the central computer being communicatively connectable to the first control computer and to the server, the central computer being configured to dynamically allocate and transmit unique codes from the server to the first control computer, wherein the central computer and the server include a data processing arrangement including a data processor, wherein the data processor of the server is configured to receive a first request for a first patch of unique codes from the first control computer of a first printing machine, wherein the first control computer is communicatively connected to the first printing machine having a first rate of printing, wherein the first control computer controls the first printing machine for printing the unique codes in package labels;

the data processor of the server is configured to obtain printing parameters comprising a file size of a unique code and a printing speed of the first printing machine, wherein each unique code which is to be included in a patch has said file size;

the first control computer is configured to determine a first time interval between the first request to the server and a first received unique code being available to be used by the first printing machine;

the data processor of the server is configured to determine a first communication speed between the server and the first control computer;

the data processor of the server is configured to dynamically calculate a first optimum patch size of the first patch of unique codes to be delivered to the first control computer based on the first request from the first control computer of the printing machine, the printing parameters, the first time interval and the first communication speed, wherein the first optimum patch size is a patch size of the first patch of unique codes to be printed in the package labels by the first printing machine; and the data processor of the server is configured to communicate a first patch of unique codes having a patch size equal to the first optimum patch size to the first control computer of the first printing machine.

10. A system according to claim 9, wherein the first printing machine is a label printing machine.

11. A system according to claim 9, wherein the first time interval is configured to be determined by sending a test set of files between the server and the first control computer of the first printing machine.

12. A system according to claim 9, wherein the first control computer associated with the first printing machine is configured to dynamically allocate an amount of memory space to obtain a set of unique codes to be printed.

13. A system according to claim 12, wherein the first control computer of the first printing machine is configured to dynamically request a new patch of unique codes when a number of unique codes to be printed in the first control computer is below a threshold level.

14. A computer program product comprising a non-transitory computer-readable storage medium having computer-readable instructions stored thereon, the computer-readable instructions being executable by a computerized device comprising processing hardware to execute the method as claimed in claim 1.

* * * * *